J. REBSTEIN.
DRIVING OF VEHICLES.
APPLICATION FILED NOV. 25, 1913.

1,144,246.

Patented June 22, 1915.

WITNESSES:

INVENTOR:
Jakob Rebstein,
BY
Spear, Middleton, Donaldson & Spear
ATTORNEYS.

UNITED STATES PATENT OFFICE.

JAKOB REBSTEIN, OF WINTERTHUR, SWITZERLAND, ASSIGNOR TO AKTIENGESELL-SCHAFT BROWN BOVERI & CIE., OF BADEN, SWITZERLAND.

DRIVING OF VEHICLES.

1,144,246.   Specification of Letters Patent.   Patented June 22, 1915.

Application filed November 25, 1913. Serial No. 803,042.

*To all whom it may concern:*

Be it known that I, Dr. JAKOB REBSTEIN, a citizen of the Swiss Republic, and residing at Schwalmenackerstrasse, Winterthur, Switzerland, have invented certain new and useful Improvements in and Relating to the Driving of Vehicles, of which the following is a specification.

This invention relates to the driving of vehicles and more particularly to vehicles having two motors located above the wheel axles in which the cranks on both sides of the vehicle are arranged at 90° to each other.

The object of the invention is to provide means for balancing the forces due to moving rods and the like in such vehicles.

The invention consists in applying counterweights to the rotating part, to produce forces of inertia which will counterbalance the unbalanced forces at every moment.

The invention also consists in vehicles of the kind referred to above with balancing means comprising counterweights applied to the driving axles, the counterweights which are equal one to the other and are opposite the leading crank of the front motor axle in the direction of travel, and opposite the trailing crank of the rear motor axle in the direction of travel being smaller than the counterweights which are likewise equal one to the other and are located opposite the trailing crank of the front motor axle in the direction of travel and opposite the leading crank of the rear motor axle in the direction of travel.

Figure 2:
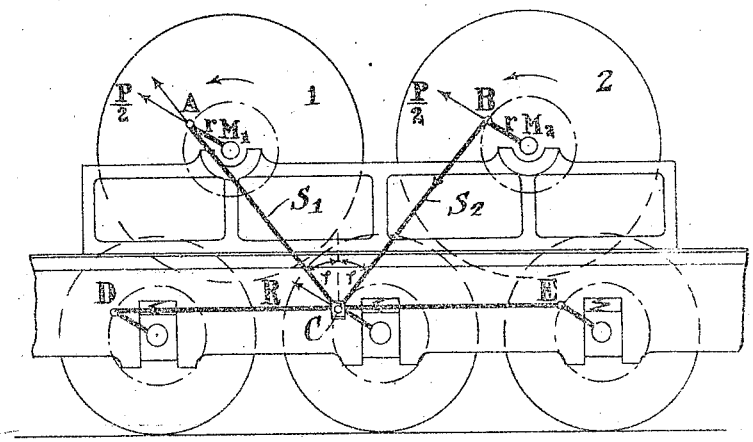
Figure 3:
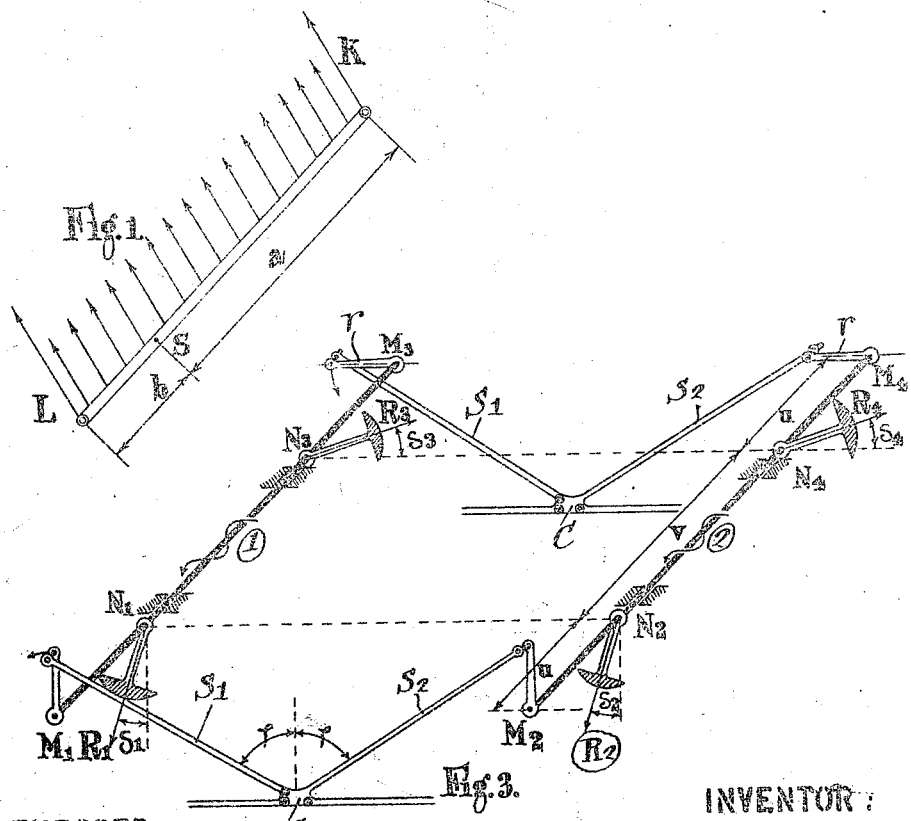

In the accompanying diagrammatic drawings:—Figure 1 is a representation of certain parts and forces; Fig. 2 shows by way of example a construction to which the invention is considered to be applied employing a two-rod driving mechanism with slot guidance for the unsprung—that is not spring supported—driving crank; Fig. 3 shows the counterweights applied in the arrangement of Fig. 2.

In carrying the invention into effect in the form illustrated by way of example the motors 1 and 2 drive the vehicle by means of driving axles $M_1$, $M_3$ and $M_2$, $M_4$ by way of cranks $r$ and links indicated by $S_1$, $S_2$ connected together at the point $C$ in a connecting rod D. R. E., a similar rod being provided on each side of the vehicle.

On each of the driving axles $M_1$, $M_3$ and $M_2$, $M_4$ two counterweights are provided $N_1$, $N_3$ being arranged on the first axle, $N_2$, $N_4$ being fixed on the second axle.

These counterweights are disposed in the following manner: The two of each pair of diametrically situated counterweights must be equal to each other, and in the case of the forward motor axle relatively to the direction of travel, the counterweight opposite the leading crank must be smaller than the counterweight which is opposite the trailing crank.

Further in general the counterweights must not be situated exactly opposite the crank pins. On the contrary the weights situated opposite the leading cranks must lead to some extent, while the weights situated opposite the trailing cranks must lag by the same angle ($\delta$). The amount of the weights and the size of the angles ($\delta$) can be determined by calculation, the results of which are given in a general form as follows: In Fig. 3 the planes in which the counterweights rotate intersect the axles $M_1$, $M_3$, $M_2$, $M_4$ in the points $N_1$, $N_2$ and $N_3$, $N_4$. The distances between them are $N_1N_3 = N_2N_4 = v$ and their distances from the end points of the motor axles are $M_1N_1 = M_3N_3 = M_2N_2 = M_4N_4 = u$.

$R_1$ $R_2$ $R_3$ and $R_4$ are the centrifugal forces produced by the counterweights, and $\delta_1$ $\delta_2$ $\delta_3$ and $\delta_4$ are the angles which are formed by these forces with the direction of the rearward extension of the crank radii.

The angles $\delta_1$ $\delta_2$ $\delta_3$ $\delta_4$ are positive in the direction of the forward movement of the vehicle. $\varphi$ is, as in Fig. 2, the half angle between the two inclined rods.

If now it be required that the sum $R_1+R_2+R_3+R_4$ and therefore the required material for the counterweights shall be a minimum then $$R_1 = R_4 = \frac{a}{v} \cdot \frac{R+P}{2} + \frac{R}{2} \cdot \frac{a}{2w+v} \cdot \cot \varphi$$

$$R_2 = R_3 = \frac{a}{v} \cdot \frac{R+P}{2} - \frac{R}{2} \cdot \frac{a}{2w+v} \cdot \cot \varphi$$

$$\delta_1 = \delta_2; \quad \delta_3 = \delta_4$$

$$\sin \delta_1 = -\frac{u}{a}; \quad \sin \delta_3 = \frac{u}{a}$$

$$\cos \delta_1 = \frac{u+v}{a}; \quad \cos \delta_4 = \frac{u+v}{a};$$

and for shortness $$a = \sqrt{2u^2 + 2uv + v^2}.$$

$\delta_1$ and $\delta_3$ are equal but of opposite sign and are dependent only on $u$ and $v$.

For $u=o$ the angles will also be equal to nil, that is to say in such a case the counterweights will be situated exactly opposite the crank pins.

Fig. 3 illustrates also the distribution of the counterweights at the points $N_1 N_2 N_3 N_4$ of the motor shafts, which correspond to the centrifugal forces $R_1 R_2 R_3 R_4$.

In operation when the vehicle is running, each point of the moving mechanism comprising the cranks, connecting rods and the like describes a circular path and therefore only centrifugal forces are produced dynamically. Thus by applying counterweights to the rotating parts to produce forces of inertia which will counterbalance the unbalanced forces at any instant balancing of the masses will be complete. There is, however, a further condition necessary for steady running. The centrifugal forces which act upon the sprung part and those which act upon the non-sprung part must each be in equilibrium in order to prevent stressing the springs and thus producing vibration of the system.

If $\omega$ is the angular velocity of the motors $M_1$ and $M_2$ and $r$ the radius of the crank (Fig. 1) then each element $d.m$ of a coupling rod will be acted upon by the centrifugal force $\omega^2 r.dm$. This force may be replaced by two parallel single forces K and L acting upon the ends of the rod. If $S$ be its center of gravity and $m$ its mass, then its ends will be acted upon by the forces $$K = \frac{b}{a+b} \cdot m \cdot \omega^2 r$$

and $$L = \frac{b}{a+b} \cdot m\omega^2 r$$

in the direction of the radius of the crank.

The point C (Fig. 2) the junction of the four coupling rods AC, BC, DC and EC is therefore acted upon by four forces of this kind resulting from the corresponding parts of the centrifugal forces of the four rods.

Their resultant R is equal to the sum of the four forces. Their action is transmitted to the crank pins A and B, by the rods AC, BC. The crank pins A and B are acted upon by forces in the direction $M_1A$ and $M_2B$ respectively which result from the centrifugal forces in the upper parts of the rods AC and BC, and the values of which may be represented by $\frac{P}{2}$.

On the other side of the vehicle the circumstances are similar except that the direction of the centrifugal forces is different by 90 degrees.

The balancing of the masses is therefore complete if counterweights are provided upon the motor axles for example as described above of such a nature that the centrifugal forces produced by the said counterweights shall counterbalance at every moment the single forces that occur at $M_1$ and $M_2$ and on the other side of the vehicle at $M_3$ and $M_4$.

It will be understood that the form of the invention described above is given by way of example only and modifications may be made. For instance the invention is applicable without further alteration if the points A and B, (Fig. 2) and the corresponding ones on the other side of the vehicle are connected together by a horizontal coupling rod. In this case, however, $\frac{P}{2}$ is equal to the component of the centrifugal forces derived from the upper parts of the inclined rods, plus that of the centrifugal forces derived from the horizontal rod A B. The formulæ are the same.

Having now described my invention what I claim as new and desire to secure by Letters Patent is:—

1. In means for the driving of vehicles in combination two driving motors, a plurality of wheel axles, said axles being situate below the axles of said motors and means for compensating the unbalanced masses of the sprung connecting rods and the like, said means comprising counterweights, the counterweights which are equal one to the other and are opposite the leading crank of the front motor axle in the direction of travel, and opposite the trailing crank of the rear motor axle in the direction of travel being smaller than the counterweights which are likewise equal one to the other and are located opposite the trailing crank of the front motor axle in the direction of travel and opposite the leading crank of the rear motor axle in the direction of travel.

2. In means for the driving of vehicles in combination two driving motors, a plurality of wheel axles, said axles being situate below the axles of said motors, and means for compensating the unbalanced masses of the sprung connecting rods and the like, said means comprising counterweights so disposed that when their planes of rotation are situated inside or outside those of the crank pins they are situated not exactly 180 degrees from the crank pins, but that the radius of the center of gravity of the counterweight forms with the plane of the crank radius an angle which leads in the case of the leading cranks and lags in the case of the trailing cranks.

3. Vehicle driving means comprising in combination two driving motors with shafts disposed across the vehicle, a plurality of wheel axles also disposed across the vehicle and situate below the aforesaid shafts, cranks on said shafts one at each end thereof, the cranks on one side of the vehicle on each shaft being set at substantially the same angle and the cranks on the other side of the vehicle on each shaft being set also at substantially the same angle, but this latter angle being 90° different from the former angle, cranks connected with the wheel axles and a connecting rod on each side of the vehicle connecting the cranks on that side, coupling rods on each side of the vehicle connecting the motor cranks with a point in the aforesaid connecting rods, and masses rigidly attached to the motor shafts in two sets as follows: a large mass and a smaller mass on each shaft, each mass being set at an angle substantially opposite to the adjacent motor crank but not quite opposite thereto, the greater mass on one shaft being on the side of the vehicle at which the smaller mass is situate on the other shaft.

In testimony whereof, I affix my signature in presence of two witnesses.

Dr. JAKOB REBSTEIN.

Witnesses:
 CARL GUBLER,
 AUGUST RUEGG.